United States Patent
Lee et al.

(10) Patent No.: US 8,054,949 B2
(45) Date of Patent: Nov. 8, 2011

(54) IMAGE BASED CALLER IDENTIFYING SYSTEM

(75) Inventors: Jin Soo Lee, Seoul (KR); Joo Min Kim, Anyang-si (KR); Yong Kyoung Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 1728 days.

(21) Appl. No.: 11/304,431

(22) Filed: Dec. 14, 2005

(65) Prior Publication Data

US 2006/0140372 A1 Jun. 29, 2006

(30) Foreign Application Priority Data

Dec. 14, 2004 (KR) .................. 10-2004-0105599

(51) Int. Cl.
*H04M 11/00* (2006.01)
*H04M 1/64* (2006.01)
*H04M 1/56* (2006.01)

(52) U.S. Cl. ............. 379/88.14; 379/88.11; 379/142.04; 455/414.4; 455/415

(58) Field of Classification Search ............... 379/88.19, 379/88.13–88.14, 142.04; 455/414.4
See application file for complete search history.

(56) References Cited

U.S. PATENT DOCUMENTS

| | | | | |
|---|---|---|---|---|
| 5,416,770 A * | 5/1995 | Stoner et al. | ................... | 370/312 |
| 5,448,620 A * | 9/1995 | Gershkovich et al. | ...... | 455/552.1 |
| 5,625,877 A * | 4/1997 | Dunn et al. | ................... | 455/454 |
| 5,666,348 A * | 9/1997 | Thornberg et al. | ........... | 370/230 |
| 5,806,072 A * | 9/1998 | Kuba et al. | ............................ | 1/1 |
| 6,104,430 A * | 8/2000 | Fukuoka | ..................... | 348/231.6 |
| 6,111,863 A * | 8/2000 | Rostoker et al. | ............... | 370/329 |
| 6,359,656 B1 * | 3/2002 | Huckins | ......................... | 348/512 |
| 6,741,586 B1 * | 5/2004 | Schuster et al. | .............. | 370/352 |
| 7,130,282 B2 * | 10/2006 | Black | ............................. | 370/296 |
| 7,158,502 B2 * | 1/2007 | Harris et al. | .................. | 370/345 |
| 7,231,223 B2 * | 6/2007 | May et al. | ...................... | 455/519 |
| 7,280,711 B2 * | 10/2007 | Yoshida et al. | ................ | 382/305 |
| 7,386,000 B2 * | 6/2008 | Lopponen et al. | ............ | 370/433 |
| 7,408,948 B2 * | 8/2008 | Lopponen et al. | ............ | 370/433 |
| 7,423,529 B2 * | 9/2008 | Singer et al. | .................. | 340/540 |
| 7,554,906 B2 * | 6/2009 | Kekki | ............................ | 370/229 |
| 7,640,293 B2 * | 12/2009 | Wilson et al. | ................. | 709/203 |
| 7,644,163 B2 * | 1/2010 | Gustafsson | .................... | 709/227 |
| 7,684,553 B2 * | 3/2010 | Wallenius et al. | ............. | 379/219 |
| 7,764,633 B2 * | 7/2010 | Marque-Pucheu | ........... | 370/279 |
| 7,787,862 B2 * | 8/2010 | Mossakowski | ................ | 455/411 |
| 7,801,953 B1 * | 9/2010 | Denman et al. | ............... | 709/204 |
| 7,809,388 B1 * | 10/2010 | Othmer | ......................... | 455/518 |
| 7,813,637 B2 * | 10/2010 | Koguchi et al. | ............... | 396/166 |
| 7,826,603 B1 * | 11/2010 | Denman et al. | .......... | 379/202.01 |
| 7,933,620 B2 * | 4/2011 | Rao et al. | ....................... | 455/518 |

(Continued)

FOREIGN PATENT DOCUMENTS

| | | |
|---|---|---|
| CN | 1179684 | 4/1998 |
| KR | 1020030012745 | 2/2003 |
| KR | 1020030018761 | 3/2003 |

(Continued)

*Primary Examiner* — Joseph T Phan
(74) *Attorney, Agent, or Firm* — Lee, Hong, Degerman, Kang & Waimey (57) ABSTRACT

A system for identifying an originator based on an image and a method thereof are disclosed. The method includes: transmitting a session initiate protocol INVITE message by inserting predetermined image information in the session initiate protocol INVITE message at a transmitting terminal; and displaying an image by analyzing image information included in a received session initiate protocol INVITE message transmitted from the transmitting terminal at a receiving terminal.

12 Claims, 7 Drawing Sheets

U.S. PATENT DOCUMENTS

| | | | |
|---|---|---|---|
| 7,965,176 B2 * | 6/2011 | Kuboyama | 340/426.13 |
| 8,001,181 B2 * | 8/2011 | Wilson et al. | 709/203 |
| 2004/0255302 A1 * | 12/2004 | Trossen | 719/318 |
| 2005/0259796 A1 * | 11/2005 | Wallenius et al. | 379/93.01 |
| 2006/0114314 A1 * | 6/2006 | Dunko | 348/14.1 |
| 2006/0174014 A1 * | 8/2006 | Bae | 709/227 |

FOREIGN PATENT DOCUMENTS

| | | |
|---|---|---|
| KR | 10-2004-0090023 | 10/2004 |
| KR | 10-2004-0099916 | 12/2004 |
| KR | 1020040099916 | 12/2004 |
| WO | 01/49056 | 7/2001 |

* cited by examiner

```
INVITE jslee@lge.com SIP/2.0
VIA SIP/2.0/UDP MM-labs.com:5060
From: binary@lge.com
Subject: Patent
To: jslee@lge.com (Lee, Jin Soo)
Call-ID: 025264198@lge.com
Content-type: application/sdp
Content-Length: 157 v=0
o=user 1234567 1234758492 IN IP4
150.150.67.1
:
```

FIG.3

```
INVITE jslee@lge.com <mailto:jslee@lge.com> SIP/2.0
VIA SIP/2.0/UDP MM-labs.com:5060
From: binary@lge.com <mailto:binary@lge.com>
Subject: Patent
To: jslee@lge.com <mailto:jslee@lge.com> (Lee, Jin Soo)
Call-ID: 025264198@lge.com <mailto:025264198@lge.com>
Content-type: application/sdp
Content-Length: 157
Authorization: Digest username="bob",
               realm="biloxi.com",
               nonce="dcd98b7102dd2f0e8b11d0f600bfb0c093",
               uri="sip:bob@biloxi.com",
               qop=auth,
               nc=00000001,
               cnonce="0a4f113b",
               response="6629fae49393a053974509785 07c4ef1",
               opaque="5ccc069c403ebaf9f0171e9517f40e41x03a039
               203c320b02394a2413c23f4252e2598f4522a13c4245o20
               52340v02r2042a3423we234523d"

v=0
o=user 1234567 1234758492 IN IP4
150.150.67.1
:
```

TEXT FORMATTED IMAGE DATA

IMAGE BASED CALLER IDENTIFYING SYSTEM

This application claims the benefit of the Korean Patent Application No. 10-2004-0105599, filed on Dec. 14, 2004, which is hereby incorporated by reference as if fully set forth herein.

BACKGROUND OF THE INVENTION

1. Field of the Invention

The present invention relates to a system for identifying an originator based on an image and a method thereof.

2. Description of the Related Art

According to development of the information communication technology, fixed and mobile terminals are allowed to receive various information such as voice, music, image, stock information and weather information.

Also, a wired/wireless communication terminal generally includes a function for identifying an originator before connecting a call made an originator.

For example, a caller ID function is widely used. The call ID function shows a telephone number of an originator so that a recipient identifies the originator before answering a call. That is, the caller ID function displays the telephone number of originator on a display of a recipient's telephone before connecting the call. A recipient can decide whether the call is accepted or not.

Since the caller ID function only shows telephone number of the originator, the recipient may have difficulty to recognize the originator by only the telephone number of originator.

In order to overcome such a shortcoming of the conventional caller ID function, manufactures of terminals introduced a function for displaying a name of originator by comparing the originator's telephone number with telephone numbers registered in a recipient's terminal.

If the originator's telephone number is not registered with the name in the recipient's terminal, the conventional caller ID function cannot display the name of the originator. Although the name of originator is displayed, a user still has difficulty to recognize an originator by only the originator's name if the originator is not familiar with the recipient.

Therefore, a mobile communication service provider provides a service to display text information of originator on a recipient's terminal by previously registering text information of originators in a mobile communication service provider's server so that the recipient identifies the originator by the text information before accepting the call from the originator. However, the service is available for only subscribers registered for the service. Since the text information is generally not the name of originator, the unsolved problem of conventional caller ID function is still remained.

Another call ID function was introduced to easily identify an originator based on an originator's picture. That is, originators are registered in a telephone number list of recipient's terminal with a picture and a name. Then, an originator's telephone number is compared telephone numbers registered in the telephone number list of recipient's terminal when a call is received. If there is the matched telephone number in the telephone number list, the name and picture of the originator are displayed on the recipient's terminal.

Such a conventional picture based caller ID function still has shortcoming. That is, if the originator is not registered in the telephone number list of recipient's terminal or if the originator is registered without the picture, the conventional picture based call ID function cannot display the picture of the originator. In order to use the conventional picture based caller ID function, a user must obtain pictures of persons registered in the telephone list. Therefore, the conventional picture based caller ID function cannot be applied to persons who are not familiar.

As a conventional image based caller identifying method, a system for identifying an originator by displaying the originator's image was introduced. The conventional system obtains an image of originator at a transmitting terminal, transmit the obtained image to a receiving terminal through a wired/wireless communication link, and a recipient identifies the originator based on the received image of originator before accepting a call made by the originator.

One of schemes disclosed by the conventional system encodes an originator's image at a transmitting terminal, the encoded image is transmitted to a receiving terminal and the receiving terminal decodes and displays the encoded image on a display of the receiving terminal. In another scheme introduced by the conventional system, feature characteristics are extracted from an originator's face image at a transmitting terminal, and the extracted feature characteristics are transmitted to a receiving terminal. Then, the receiving terminal compares the received feature characteristics with images stored in the receiving terminal and displays an image matched with the received feature characteristics as a face image of the originator to identify the originator.

Since the former scheme directly displays the face image of originator, a recipient can identify an originator instantly and accurately. However, a communication service system may waste resources to transmit a still image from a transmitting terminal to a receiving terminal before connecting a call. In case of the latter scheme, the communication service system may not waste resources since the feature characteristics are only transmitted from the receiving terminal to the transmitting terminal. That is, less amount of data are transmitted before connecting the call. However, supplementary functions and devices for identifying and extracting the feature characteristics from the originator's face are required. Also, there is great possibility to occur errors to recognize the originator's face according to the performance of terminal that recognizes the originator's face.

SUMMARY OF THE INVENTION

Accordingly, the present invention is directed to an image based caller identifying system and a method thereof that substantially obviates one or more problems due to limitations and disadvantages of the related art.

An object of the present invention is to provide an image based caller identifying system for identifying an originator based on an image transmitted from the originator before accepting a call made by the originator in an IP multimedia subsystem (IMS) environment.

Another object of the present invention is to provide an image based caller identifying system for accurately identifying an originator based on an image transmitted from the originator without requiring additional communication link and supplementary processes for transmitting the image by inserting image information in a session initiation protocol (SIP) INVITE message at a transmitting terminal, analyzing the image information included in the SIP INVITE message at a receiving terminal and displaying the analyzed image information at the receiving terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for identifying an originator based on an image including: transmitting a session initiate protocol INVITE message by inserting predetermined image information in the session initiate protocol INVITE message at a transmitting terminal; and displaying an image by analyzing image information included in a received session initiate protocol INVITE message transmitted from the transmitting terminal at a receiving terminal.

In another aspect of the present invention, there is provided a transmitting terminal in a system for identifying an originator based on an image transmitted from the originator before connecting a call, the transmitting terminal including: a message creating unit for crating a session initiate protocol INVITE message by inserting image information in the session initiate protocol INVITE message; and a transmitting unit for transmitting the created session initiate protocol INVITE message.

In a further another aspect of the present invention, there is provided a receiving terminal in a system for identifying an originator based on an image transmitted from the originator before connecting a call, the receiving terminal including: a message receiving unit for receiving a session initiate protocol INVITE message; a data analyzing unit for analyzing image information included in the received session initiate protocol INVITE message; and a display for displaying the analyzed image information.

In a still further another aspect of the present invention, there is provided a transmitting/receiving terminal in a system for identifying an originator based on an image transmitted from the originator in an Internet protocol multimedia subsystem environment, the transmitting/receiving terminal including: an image format transforming unit for transforming an image data for identifying an originator before connecting a call to a text data or transforming a received text data to a binary image data; a message creating and analyzing unit for creating a session initiate protocol INVITE message by recording the transformed text data into a predetermined field of the session initiate protocol INVITE message or analyzing a text formatted image data in a predetermined field of a received session initiate protocol INVITE message; a transmitting/receiving unit for transmitting or receiving a session initiate protocol INVITE message having the text formatted image data; and a display for displaying an image recovered through analyzing and transforming.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

At first, the Internet protocol (IP) multimedia subsystem (IMS) environment will be briefly described.

The IMS is a communication standard introduced by a $3^{rd}$ generation partnership project (3GPP) to support various services by connecting a wireless mobile communication terminal to an IP network capable of providing plenty of services. The IMS defines how to connect terminals to the IP network through a server and how to select a server to connect the terminals to the IP network. That is, the IMS defines components and sequence of processes required to connect the terminals to the IP network.

In the present invention, a method for providing a caller identifying service from a terminal in the IMS environment is disclosed. Since the disclosed method satisfies the IMS, the disclosed method can be applied to any types of terminals in the IMS environment.

A transmitting terminal according to the present invention will be described to transmit an image as an example of data to identify an originator. However, the transmitting terminal according to the present invention may transmit the image data including still image data, moving image data, text data or audio data which are stored in the terminal to identify the originator. Also, the transmitting terminal may select and transmit a predetermined image which is directly created by a user or provided from a manufactured as well as an image of user's face.

Figure 1:
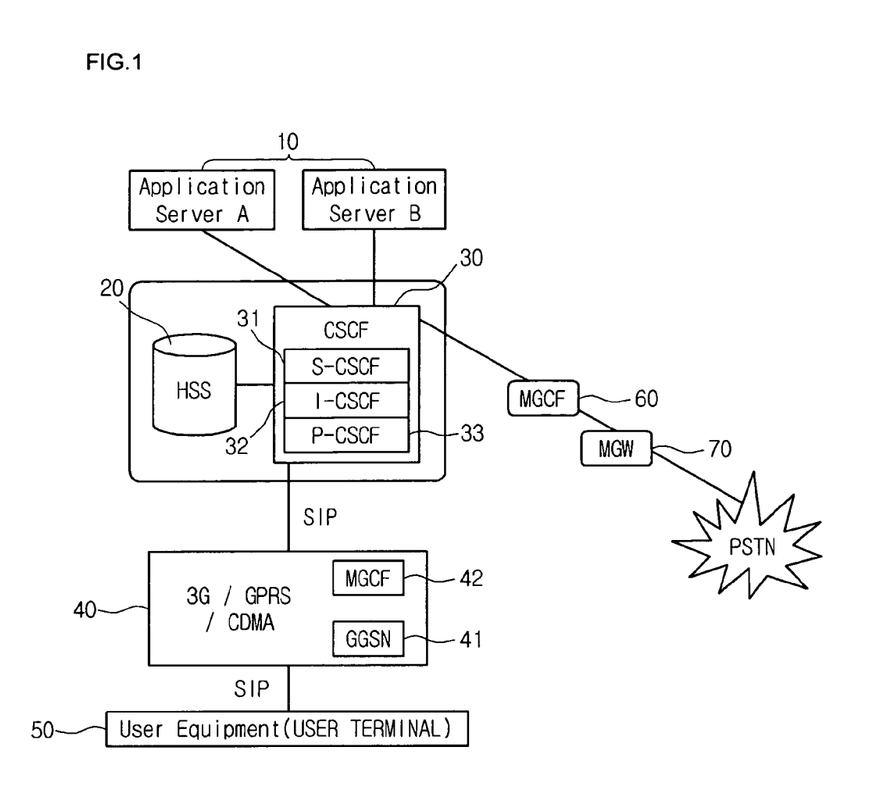
FIG. 1 is a diagram illustrating an IP multimedia subsystem (IMS)

FIG. 1 is a diagram illustrating an IP multimedia subsystem (IMS).

Referring to FIG. 1, the IMS includes an application server 10, a home subscriber server (HSS) 20, a call session control function (CSCF) 30, a mobile communication network (3G)/general packet radio service (GPRS)/CDMA 40, a user terminal 50, a media gateway control function (MGCF) 60 and a media gateway (MGW) 70.

The HSS 20 has information of subscribers and provides information of corresponding subscriber according to a request. The CSCF 30 performs functions for controlling a gateway and a call, managing serving profiles and processing addresses. Herein, a serving-CSCF 31 performs a function as a register and a function controlling a session of end points.

An interrogating-CSCF (I-CSCF) 32 registers a call from a terminal, controls a session flow thereof and allocates the S-CSCF to register a SIP which is transmitted by a user as a connecting point when a call generated from a subscriber's terminal. A proxy-CSCF (P-CSCF) 33 performs operations as a proxy and a user agent.

The MGCF 60 controls data to transmit to external public switched telephone network (PSTN). The MGW 70 is for connecting the terminals to the PSTN.

A gateway GPRS system node (GGSN) 41 is a gateway between a wireless switching network and an Internet network so that a wireless terminal transmits and receives data to/from a destination in the general Internet network through the wireless switching network having a base station. A serving GPRS support node (SGSN) 42 traces a mobile node and performs operations as a tunnel exchanging a packet with the GGSN.

Terminals in the IMS shown in FIG. 1 are allowed to connect different home networks. That is, the terminals and the home network are connected through a mobile communication network, GGSN 41/SGSN 42. In order to communicate with other terminal, a session is connected at first. After connecting the session, the terminals transmit and receive data one another. In the present invention, an image is transmitted when the session is connected between terminals because an originator is identified before transmitting and receiving data between terminals.

Hereinafter, processes of connecting a session according to the IMS specification in the IMS shown in FIG. 1 will be described.

At first, a transmitting terminal transmits a request of session to a receiving terminal. In order to transmit the request, the transmitting terminal is registered as a transmitting side at a server in the IMS network or an authentication process is performed to determine whether the transmitting terminal is previously registered. Then, the session connection process is performed for transmitting and receiving a call.

Hereinafter, the session connection process will be described.

At first, the transmitting terminal transmits an SIP INVITE message to a corresponding CSCF connected to the transmitting terminal. The INVITE message includes an address of a receiving terminal. The CSCF connected to the transmitting terminal transmits the INVITE message to a CSCF connected to the receiving terminal. Then, the CSCF connected to the receiving terminal transmits the received INVITE message to the receiving terminal. The receiving terminal receives the INVITE message and makes a bell sound. If the receiving terminal accepts the call from the transmitting terminal, the receiving terminal transmits a message denoting the acceptance of call to the transmitting terminal.

The session connection process is described when a user manually connects a session. However, the IMS discloses other methods of automatically connecting the session between the transmitting terminal and the receiving terminal. The present invention is not limited by the types of the connecting session methods. That is, the present invention can be applied to various connection methods because those connection methods commonly transmit the INVITE message and the present invention uses the INVITE message.

In order to receive an image to identify an originator at a receiving terminal, the image must be transmitted and received to identify the originator when the receiving terminal makes a bell sound to notice call receiving to a user. Therefore, the image of the originator must be received at the receiving terminal when the INVITE message is arrived at the receiving terminal. Accordingly, the image information for identifying the originator is included in the INVITE message of SIP in the present invention.

Figure 2:
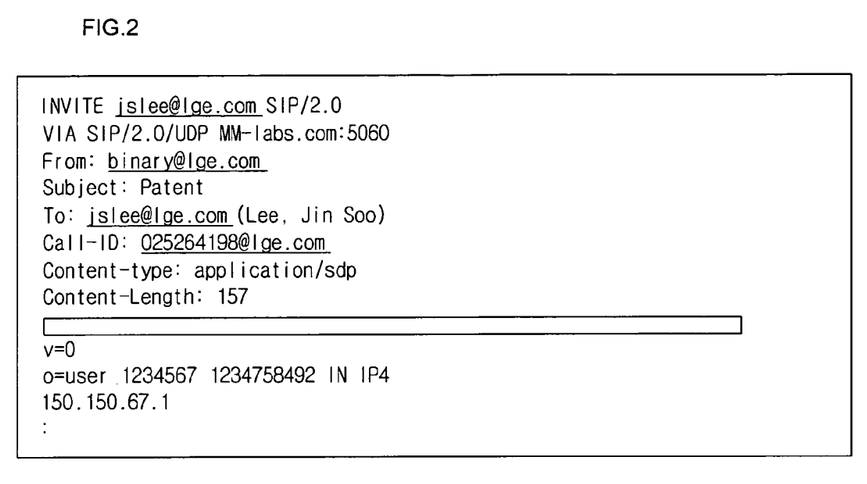
FIG. 2 schematically shows a structure of INVITE message.

FIG. 2 schematically shows a structure of INVITE message. As shown in FIG. 2, the INVITE message includes a header having information about addresses and a descriptor for detail information.

Figure 3:
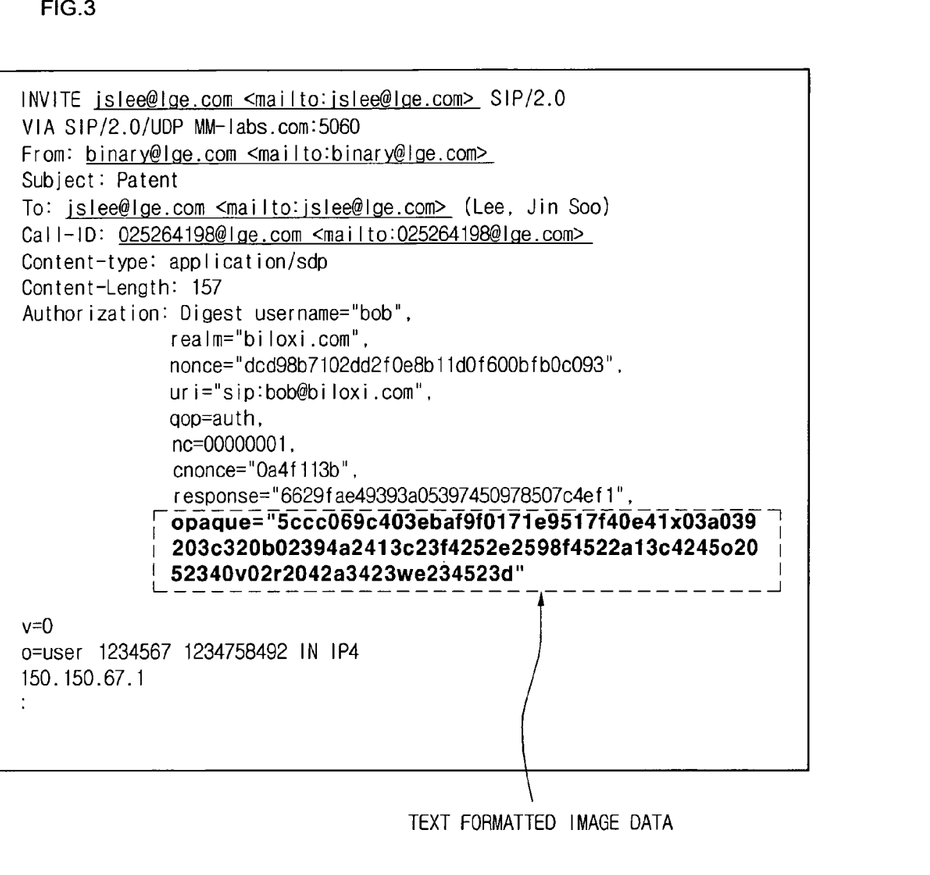
FIG. 3 shows an INVITE message having an image of originator according to an embodiment of the present invention.

FIG. 3 shows an INVITE message having an image of originator according to an embodiment of the present invention. As shown in FIG. 3, the INVITE message includes an authorization header. The authorization header includes an opaque field. The opaque field can include a predetermined length of text.

In the present invention, the INVITE message is created by inserting image information in the opaque field to identify an originator. FIG. 3 shows the INVITE message including the image information inserted in the opaque field which is distinguished as a bold type numerals and characters. In order to insert the image information, a transmitting terminal according to the present invention includes a module for transforming an image data to a text formatted data to insert the image data into the opaque field and a SIP creating module for creating the INVITE message to have the opaque field with the text formatted image data. Also, a receiving terminal according to the present invention includes a SIP analyzing module for recognizing the opaque field in the INVITE message and extracting the text formatted image data from the opaque field and a module for transforming the text formatted image data to the image in binary format.

Figure 4:
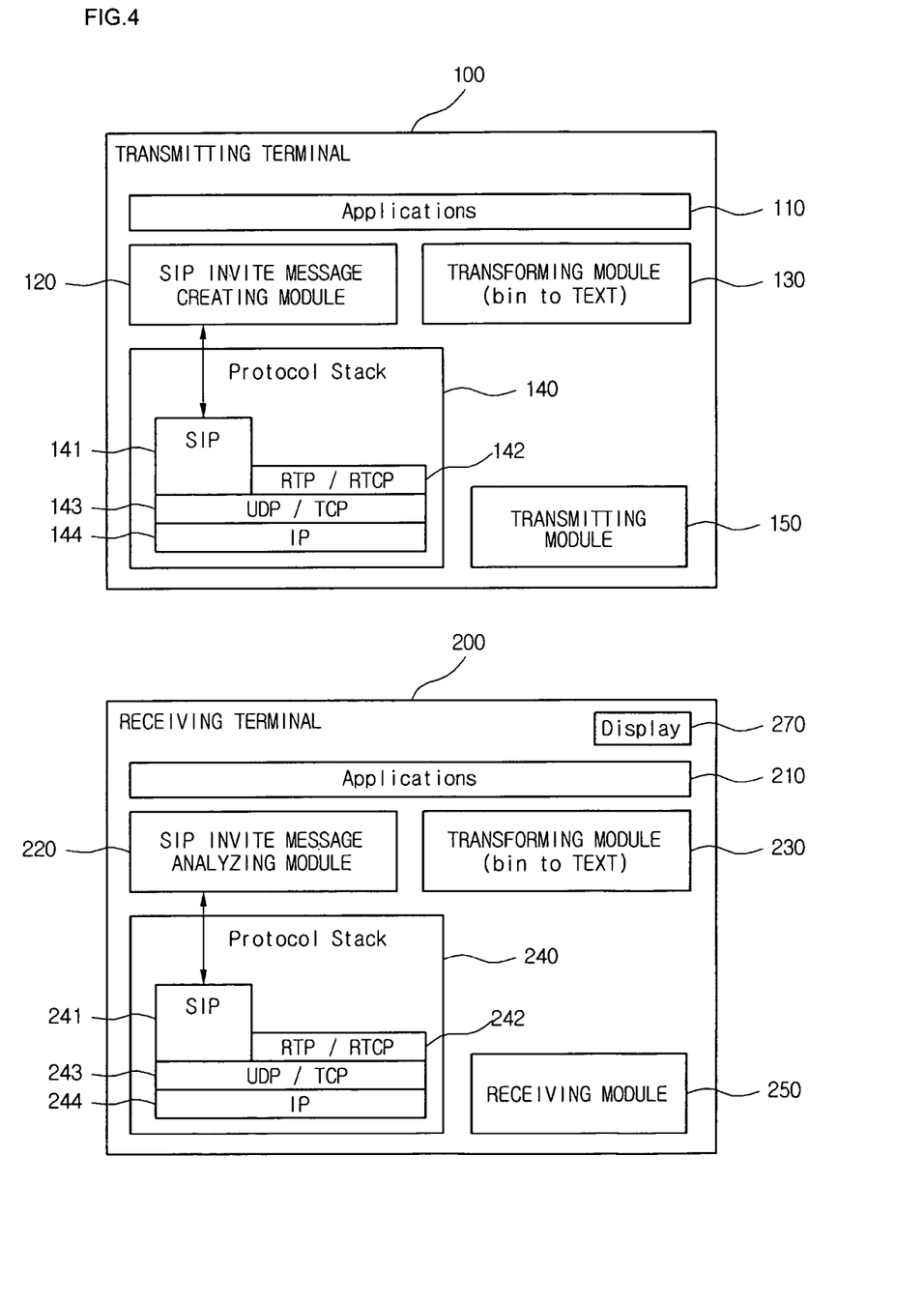
FIG. 4 is a block diagram illustrating a transmitting and a receiving terminal according to a first embodiment of the present invention.
Figure 5:
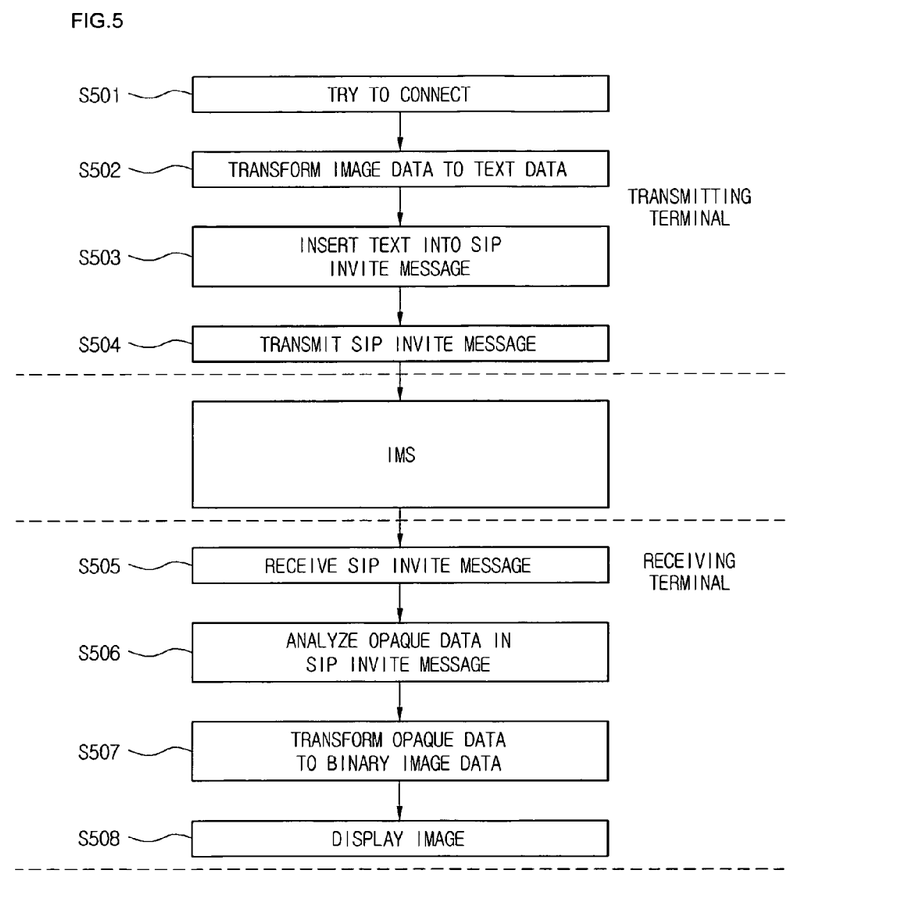
FIG. 5 is a flowchart of a method of identifying an originator based on an image according to an embodiment of the present invention.

The transmitting and the receiving terminal according to the present invention are shown in FIG. 4 and a method of inserting and extracting the image and displaying the extracted image is shown in FIG. 5.

As shown in FIG. 4, the transmitting terminal 100 includes an application 110 related to mobile communication, a SIP INVITE message creating module 120 for creating a SIP INVITE message, a transforming module 130 for transforming binary image data to text data to insert the image information into the SIP INVITE message, a protocol stack 140 for performing processes related communication control and a transmitting module 150 for transmitting data. The protocol stack 140 includes a SIP 141 for connecting a session and a real time transport protocol (RTP)/real time control protocol (RTCP) 142, a user datagram protocol (UDP)/transmission control protocol (TCP) 143 and an Internet protocol (IP) 144 as a protocol stack for transmitting media. Since these protocol stacks are well known to those skilled in the art, detail descriptions thereof are omitted. The transmitting terminal 100 may include a memory for storing image data.

The receiving terminal 200 shown in FIG. 4 includes an application 210 related to mobile communication, a SIP INVITE message analyzing module 220 for analyzing the SIP INVITE message, a transforming module 230 for transforming a text formatted image data in the SIP INVITE message to a binary image data, a protocol stack 220 for performing processes related to communication control, a receiving module 250 for receiving data and a display 270 for displaying an image. The protocol stack 240 includes a SIP 241 for connecting a session, and a RTP/RTCP 242, an UDP/TCP 243 and an IP 244 as a protocol stack for transmitting media. Since these protocol stacks are well know to those skilled in the art, detail descriptions thereof are omitted.

A method of identifying an originator based on an image according to an embodiment of the present invention will be described with reference to a flowchart shown in FIG. 5 and the transmitting terminal 100 and the receiving terminal 200 shown in FIG. 4.

At first, the transmitting terminal 100 tries to connect a session to the receiving terminal 200 in operation S501. Then, the transmitting terminal transforms an image for identifying an originator to a text data in operation S502. Herein, the image for identifying an originator may be a still image or a moving image stored in a memory (not shown) in the transmitting terminal 200. The image is a binary image data and the transforming module 130 transform the binary image data to the text data. Since the opaque field in the SIP INVITE message can includes a predetermined length of text data, the binary image data is transformed to the text formatted image data.

The SIP INVITE message creating module 120 inserts the text formatted image data into the SIP INVITE message in operation S503. That is, the text formatted image data is recorded in the opaque field in a header of the SIP INVITE message. The transmitting module 150 transmits the SIP INVITE message having the text formatted image data to the receiving terminal 200 through the IMS network.

The receiving terminal 200 receives the SIP INVITE message with the text formatted image data and displays the image by extracting the text formatted image data from the SIP INVITE message and transforming the text formatted image data to the binary image data. At first, the receiving module 250 receives the INVITE message in operation S505. The SIP INVITE message analyzing module 220 analyzes the received SIP INVITE message. That is, the SIP INVITE message analyzing module 220 extracts the text formatted image data from the opaque field in the SIP INVITE message in operation S506. Then, the transforming module 230 transforms the extracted text data to a binary image data in operation S507. After transforming, the display 270 displays the binary image data before connecting the call made by the transmitting terminal 100 in operation S508.

As described above, the receiving terminal 200 display the image transmitted from the transmitting terminal to identify the originator.

The image for identifying an originator may be an image obtained at the transmitting terminal when the transmitting terminal transmits a SIP INVITE message, or a still image or a moving image stored in the memory. The transmitting terminal may automatically select one of images stored in the memory before transmitting the SIP INVITE message. In case of the still image, a JPEG format image is used in the present embodiment. Therefore, the receiving terminal may further include a JPEG decoder for displaying the received JPEG image. Also, the transmitting terminal may further include a camera and a JPEG encoder. Such a receiving terminal and a transmitting terminal are shown in FIG. 6.

Figure 6:
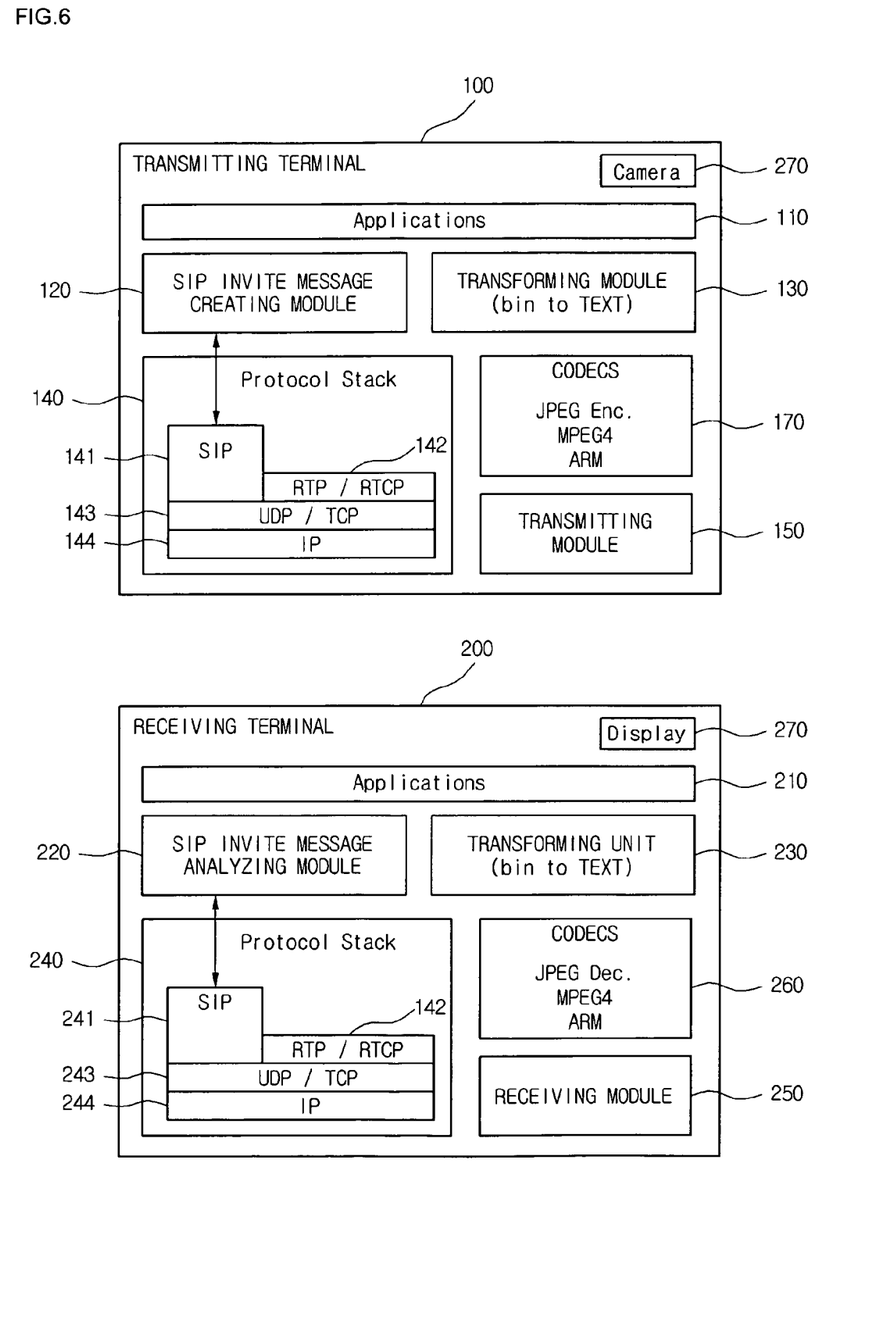
FIG. 6 is a block diagram showing a transmitting and a receiving terminal according to a second embodiment of the present invention.

As shown in FIG. 6, the transmitting terminal 100 includes a camera 160 for obtaining an image and a CODECS 1870 for compressing and encoding the obtained image from the camera 160. Herein, the CODECS 170 may be a JPEG encoder. The receiving terminal 200 includes a CODECS 260 for decoding the compressed and coded image data transmitted from the transmitting terminal 100. Herein, the CODECS 260 may be a JPEG decoder.

The transforming module 130 of the transmitting terminal 100 shown in FIG. 6 may transform the image obtained by the camera to a text data and insert the transformed text data into the SIP INVITE message. Then, the transmitting terminal 100 transmits the SIP INVITE message to the receiving terminal 200. Furthermore, the transmitting terminal 100 shown in FIG. 6 may compress and encode the image data to JPEG data using the CODECS 170 and transform the JPEG data into a text data using the transforming module 130. Then, the transmitting terminal 100 may transmit the SIP INVITE message by inserting the text data into the SIP INVITE message.

The receiving terminal 200 shown in FIG. 6 recovers the image data included in the SIP INVITE message as follows. At first, the SIP INVITE message analyzing module 220 of the receiving terminal 200 analyzes the received SIP INVITE message. Herein, the text formatted image data is extracted from the opaque field and the extracted text data is transformed to the binary image data using the transforming module 230 of the receiving terminal 200. Since the image data is encoded to the JPEG data in the transmitting side, the CODECS 260 such as the JPEG decoder decodes the JPEG data to original binary image data and the display 270 displays the decoded image data.

The transmitting terminal 100 and the receiving terminal 200 shown in FIGS. 4 and 6 may be merged as single transmitting/receiving terminal. That is, the transmitting terminal 100 and the receiving terminal 200 may be embodied as a transmitting/receiving terminal having an application, protocol stack, a SIP creating module, a SIP analyzing module, a binary/text and text/binary transforming module and a transmitting/receiving module. The transmitting/receiving terminal may further include a camera. Such a transmitting/receiving terminal is shown in FIG. 7.

Figure 7:
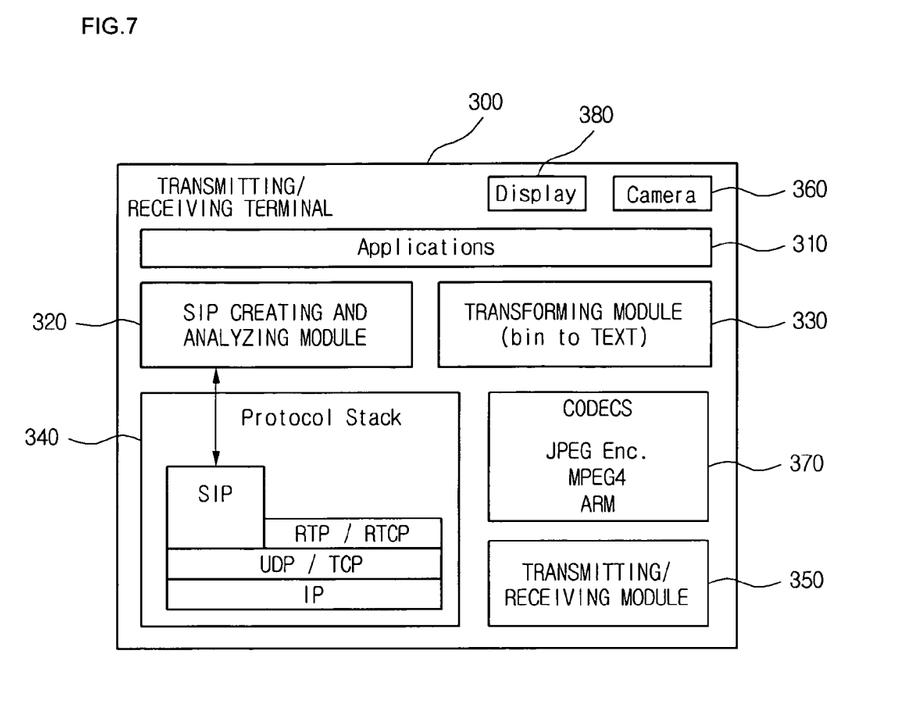
FIG. 7 is a block diagram depicting a transmitting and a receiving terminal according to a third embodiment of the present invention.

As shown in FIG. 7, the transmitting/receiving terminal according to the present invention includes an application 310 related to mobile communication, a SIP creating and analyzing module 320 for creating a SIP INVITE message by recording a text formatted image data in the SIP INVITE message or analyzing the text formatted image data included in a corresponding filed in a received SIP INVITE message, a transforming module 330 for transforming an image for identifying an originator to a text data or transforming a received text formatted image data to a binary image data, a protocol stack 340, a transmitting/receiving module 350 for transmitting and receiving the SIP INVITE message with the text formatted image data, a camera 360 for obtaining the image for identifying an originator, a CODECS 370 for compressing and encoding the binary image data to be transformed to the text data, or extracting and recovering the text data inserted in the SIP INVITE message to the binary image data, and a display 380 for displaying the image for identifying the originator based on the recovered image through analyzing and transforming.

When the transmitting/receiving terminal shown in FIG. 7 transmits the image for identifying the originator, the CODECS 370 compresses and encodes the image obtained by the camera 360 or stored in the memory (not shown), the transforming module 330 transforms the compressed image data to the text data, the SIP creating and analyzing module 320 inserts the text data into the opaque field of the SIP INVITE message, and the transmitting/receiving module 350 transmits the SIP INVITE message.

when the transmitting/receiving terminal shown in FIG. 7 receives the SIP INVITE message, the transmitting/receiving module 350 receives the SIP INVITE message, the SIP creating and analyzing module 320 extracts the text formatted image data from the opaque field of the received SIP INVITE message, the transforming module 330 transform the text formatted image data to the encoded image data, the CODECS 370 decodes and decompresses the encoded image data to the original binary image data and the display 380 displays the image for identifying the originator based on the original binary image data. Therefore, the image is displayed to identify the originator before connecting the call made by the originator.

As described above, the originator is easily identified at the receiving terminal by displaying the image of the originator such as a face image of the originator on the receiving terminal using the IMS environment.

Since the system and method for identifying the originator based on the image before connecting a session using the IMS standard, the system and method according to the present invention can be easily embodied in the IMS environment.

Since the system and method according to the present invention uses the SIP standard, the system and method according to the present invention can be extended to all communication environments connecting to the SIP as well as the IMS environment. And, the originator can be identified using various images such as an avatar of originator, a still image or a moving image before connecting a call made by the originator using the system and method for identifying the originator based on the image according to the present invention.

The system and method for identifying the originator based on the image according to the present invention can be easily embodied since the images of originators are not required to be registered in a server or the terminal. Also, additional cost is not required. The originator can be accurately identified according to the present invention by displaying the image of originator before connecting the call.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for identifying an originator based on an image, the method comprising:
    transmitting a session initiate protocol INVITE message by inserting predetermined image information in the session initiate protocol INVITE message at a transmitting terminal; and
    displaying the image at a receiving terminal by analyzing the predetermined image information included in the session initiate protocol INVITE message transmitted from the transmitting terminal to the receiving terminal,
    wherein the transmitting terminal transforms the predetermined image information into image data in a text format to be inserted into an opaque field of the session initiate protocol INVITE message, inserts the text formatted image data into the opaque field of the session initiate protocol INVITE message, and transmits the session initiate protocol INVITE message with the text formatted image data, and
    wherein the receiving terminal displays the image by extracting the text formatted image data from the opaque field of the session initiate protocol INVITE message, transforming the extracted image data into binary image data, decoding the binary image data into original image data using a decoder, and displaying the original image data.

2. The method according to claim 1, wherein the session initiate protocol INVITE message is transmitted through a call session control function of an Internet protocol multimedia subsystem.

3. The method according to claim 1, wherein the image information is obtained when transmitting the session initiate protocol INVITE message or a stored image is selected, the obtained or selected image information is compressed and the compressed image information is transmitted.

4. The method according to claim 1, wherein the image information is JPEG image data and the JPEG image data is transformed and inserted into the opaque field of the session initiate protocol INVITE message.

5. A transmitting terminal in a system for identifying an originator based on an image transmitted from the originator before connecting a call, the transmitting terminal comprising:
    a format transforming unit for transforming image information into image data in a text format;
    a message creating unit for creating a session initiate protocol INVITE message by inserting the text formatted image data into an opaque field of the session initiate protocol INVITE message; and
    a transmitting unit for transmitting the created session initiate protocol INVITE message with the text formatted image data,
    wherein a receiving terminal extracts the text formatted image data from the opaque field of the transmitted session initiate protocol INVITE message, transforms the extracted image data into binary image data, decodes the binary image data into original image data using a decoder, and displays the original image data.

6. The transmitting terminal according to claim 5, further comprising:
    an image obtaining unit for obtaining the image information using a camera when transmitting; and
    a compressing unit for compressing the obtained image.

7. The transmitting terminal according to claim 5, further comprising a JPEG compressing unit for compressing the image information in a JPEG format and recording the compressed image information in the session initiate protocol INVITE message.

8. A receiving terminal in a system for identifying an originator based on an image transmitted from the originator before connecting a call, the receiving terminal comprising:
    a message receiving unit for receiving a session initiate protocol INVITE message;
    a data analyzing unit for extracting text formatted image information from an opaque field included in the received session initiate protocol INVITE message;
    a format transforming unit for transforming the extracted image information into binary image information;
    a decoder for decoding the binary image information into original image data; and
    a display for displaying the original image data,
    wherein the text formatted image information is transformed from image information by a transmitting terminal, and inserted by the transmitting terminal into the opaque field of the session initiate protocol INVITE message, and the transmitting terminal transmits the session initiate protocol INVITE message with the inserted text formatted image data to the receiving terminal.

9. The receiving terminal according to claim 8, wherein the binary image information is compressed image data, and the decoder decodes the compressed image data into the original image data.

10. The receiving terminal according to claim 8, wherein the binary image information is JPEG image data, and the decoder comprises a JPEG decoder for decoding the JPEG image data into the original image data.

11. A transmitting/receiving terminal in a system for identifying an originator based on an image transmitted from the originator in an Internet protocol multimedia subsystem environment before connecting a call, the transmitting/receiving terminal comprising:

an image format transforming unit for transforming image data to text formatted image data for identifying the originator, or transforming received text formatted image data to binary image data;

a message creating and analyzing unit for creating a session initiate protocol INVITE message by recording the text formatted image data in an opaque field of the session initiate protocol INVITE message or analyzing text formatted image data in the opaque field of a received session initiate protocol INVITE message;

a transmitting/receiving unit for transmitting or receiving the session initiate protocol INVITE message including the text formatted image data; and a display for displaying original image data recovered through the analyzing and transforming, wherein the transmitting/receiving unit comprises a decoder for decoding the binary image data into the original image data.

12. The system according to claim 11, further comprising:

a camera for obtaining the image; and a compressing and recovering unit for compressing the image data to be recorded by the message creating and analyzing unit in the session initiate protocol INVITE message as the text formatted image data, or extracting the image data from the session initiate protocol INVITE message and recovering the image by using the decoder to decode the binary image data to the original image data.

* * * * *